United States Patent Office 3,163,658
Patented Dec. 29, 1964

3,163,658
PROCESS FOR PREPARING ROSENOXYD AND ISOMERS THEREOF
Emile H. Eschinasi, Montclair, and Mary Lou Cotter, East Orange, N.J., assignors to The Givaudan Corporation, New York, N.Y., a corporation of New Jersey
No Drawing. Filed Dec. 27, 1962, Ser. No. 247,521
6 Claims. (Cl. 260—345.1)

The present invention relates to an improved and novel process for preparing Rosenoxyd and isomers thereof.

Rosenoxyd, 2-(2'-methyl-1'-propenyl)-4-methyl tetrahydropyrane, (I) has been found to be a small, yet important constituent of the oils of rose and geranium. Seidel and Stoll, Helvetica Chemica Acta, 42, 1830–44 (1959); Seidel et al., ibid., 44, 598–606 (1961); and Naves, Lamparsky and Ochsner Bulletin de la Société Chimique de France, page 645, 1961. Rosenoxyd, as well as its isomer, 2-(2-methyl-2'-propenyl)-4-methyl-tetrahydropyrane (II), exists in the cis and trans forms.

It has already been noted by others that Rosenoxyd and its aforementioned isomer, either per se or in admixture, has the property of imparting to artificial geranium oil, as well as perfume compositions containing same, odor qualities such as those possessed by the natural oil of geranium. Further, it has also previously been found that Rosenoxyd and said isomer enhance the odor qualities of natural oil of geranium, as well as perfume compositions containing the same.

In view of the olfactorily desirable properties of Rosenoxyd and the aforementioned isomer, taken into account with the cost of natural oil of geranium, it is not surprising that efforts have been made to develop synthetic processes for preparation of Rosenoxyd and its aforementioned isomer. While such efforts have been successful, the synthetic methods thus far developed, to our knowledge, have certain disadvantages. For example, prior methods involve various reaction steps, being time consuming, requiring costly reagents, and being difficult to conduct on a commercial scale.

We have, by the present invention, succeeded in providing a synthetic method for the preparation of Rosenoxyd and its aforementioned isomer, which method overcomes the indicated disadvantages of the prior art. Our method involves the treatment of 3,7-dimethyloctane-1,6,7-triol, with catalysts hereinafter specified at elevated temperatures, to yield, directly, a mixture comprising the cis and trans forms of Rosenoxyd and its aforesaid isomer, as well as other isomers. The starting triol, a known compound, A. Kötz et al., J. Prakt. Chemie 107 (1924) 193, is obtained by the hydroxylation of the easily obtained and abundant, β-citronellol, with hydrogen peroxide or peracids.

An unexpected advantage of our process is that mixtures comparatively rich in Rosenoxyd are obtained. Also, other isomers of Rosenoxyd are formed according to our process. Reference is made to 2-(2'-methylpropylidene)-4-methyl tetrahydropyrane (III), and 2-(2'-methylpropyl)-4-methyl-2-dihydropyrane (IV).

To facilitate understanding of our invention we give our present concept of the mechanism by which Rosenoxyd and isomers are formed from the starting triol, it being understood that we do not wish to be held accountable for the correctness of our views.

The dehydration of the triol could proceed via an oxepane 7-membered ring which may contract to a six membered hydrogenated pyrane ring under the influence of carbonium ion forming catalysts. It should be realized that through a successive migration of the carbonium ion followed by deprotonation, a number of Rosenoxyd isomers may result namely:

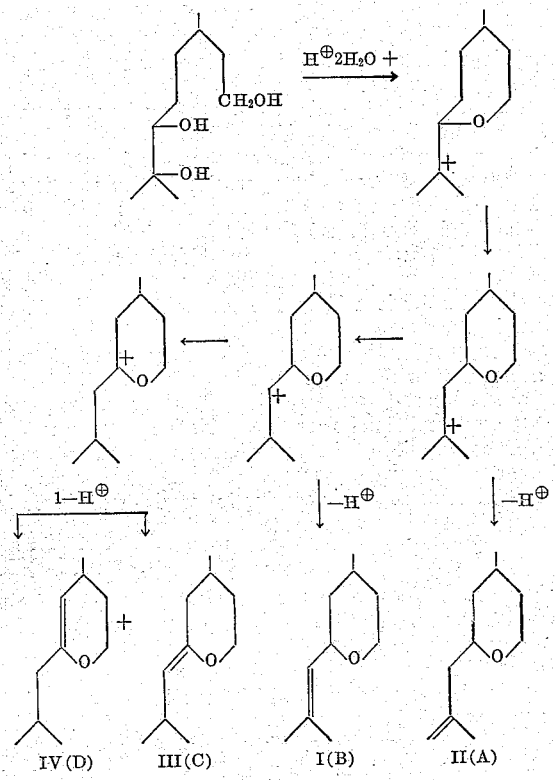

It should also be appreciated that forms A and B could exist in two additional cis-trans forms.

The extent of the formation of the various isomers is apparently dependent on the dehydration conditions and the catalyst used.

Strong catalysts like concentrated 93% sulfuric acid should be avoided because of their tendency to bring about extensive dehydration products. Also, any pyrane formed under these conditions would not be stable and its ether linkage would be split. Too mild catalysts like neutral salts may bring about partial dehydration of the triol but cyclization will not take place. Moderately strong acids and acid salts capable of forming carbonium ions are preferred for the dehydration and cyclization of the triol. In addition, whereas most inorganic acids in proper concentration and under appropriate conditions could partially convent the triol to the desired Rosenoxyd and isomers they also facilitate the formation of 3,7-dimethyl-6-oxooctanol as a substantial by-product through a semi-pinacolic rearrangement and dehydration of the triol thus lowering the yield of desired materials.

Among the preferred acid catalysts used in the dehydration of the triol in accordance with our process we found commercially available 85% phosphoric acid to be most suitable. Other suitable acid catalysts are p-toluene sulfonic acid and sulfuric acid in suitable concentration (40–70%). However, in concentrations exceeding 90%, sulfuric acid will cause extensive dehydration and carbonization; whereas in great dilutions it will favor the formation of 3,7-dimethyl-6-oxooctanol. For these reasons, we prefer to use 85% phosphoric acid which gives better and more reliable results.

Acid mineral salts or acid oxides such as alkali bisulfates, such as potassium hydrogen sulfate, boron oxides and cupric chlorides are useful catalysts in our process although none of them suppresses the formation of the 3,7-dimethyl-6-oxooctanol. Because of their heterogeneous nature, acid salts have to be well dispersed during the reaction and may give less reliable results than 85% phosphoric acid which is homogeneously dissolved in the triol.

In general, the catalyst used should be a powerful dehydrating agent and acidic enough to provide the carbonium ion required for the ring contraction and rearrangement, but mild enough to limit the acid rearrangement of the triol to the corresponding keto alcohol.

Because of the desirability to form the isomer I (which is present mainly in the more stable cis form) in the oil of geranium it would be appreciated to have a selective method which would convert either the triol directly into the I form or a mixture of all the isomers (I, II, III and IV) mainly into the desirable cis form of I. Here again we have found a distinct advantage in the use of 85% phosphoric acid to promote such a desirable conversion.

The reaction conditions which may be employed in accordance with our present invention vary and are of progressive rather than critical significance. High tempertures result in shorter time periods for the reaction as well as permitting the use of lower catalyst concentrations. Unduly high temperatures are undesirable because of side reactions causing lower yields of the desired materials. However, in order further to teach how our process may be used we give the following instructions.

The catalysts, whether acids or acid salts, may be used in amounts from about 0.05 mole to about 1 mole per mole of starting triol. Preferred amounts range from between about 0.2 to about 0.4 mole of catalyst per mole of triol.

Reaction temperatures which have been found suitable are those within the range from about 100° C. to about 250° C., temperatures within the range from about 110° C. to about 175° C. being preferred. Lower temperatures result in undesirably long reaction periods and higher temperatures bring out the formation of by-products.

The process of our invention may be employed under subatmospheric, atmospheric or superatmospheric pressure. It is normally preferred to conduct the reaction under reduced pressure.

The reaction period for our present process will depend on various factors, including, inter alia, the temperature of the reaction and whether the reaction is conducted as a continuous one or by the batch method.

In order to illustrate our invention further the following examples are given.

EXAMPLE I

*Preparation of 3,7-Dimethyloctane-1,6,7-Triol*

A mixture of 330 grams of peracetic acid (40%), 330 ml. of water, and 15 grams of concentrated sulfuric acid (93%) was dropped into 290 grams of citronellol over a period of 30 minutes, the reaction mixture being maintained at a temperature of 32° C. to 38° C. The citronellol used had a purity of 80%, and an index of refraction ($n_D^{20}$) equal to 1.4543. The impurities in the citronellol were dimethyl octanol (11%), nerol (3%) and rhodinol (6%).

The reaction mixture was maintained within the aforesaid temperature range, under agitation, for 2½ hours, and was then poured into 400 grams of 50% aqueous sodium hydroxide. The resulting top layer was separated and then distilled under vacuum, yielding 53 grams of a 165° C.–175° C. at 2 mm. mercury pressure. light boiling fraction, $n_D^{20}$ of 1.4354–1.4635, boiling point of up to 160° C. at 2–4 mm. mercury pressure, and 175 grams of the desired triol, $n_D^{20}$ of 1.4741, B.P.

EXAMPLE II

*Preparation of Cis and Trans 2-(2'-Methyl-1'-Propenyl)-4-Methyl Tetrahydropyrane (I)*

A quantity of 7 grams of 3,7-dimethyloctane-1,6,7-triol was heated in a Claisen flask with 0.5 gram of potassium hydrogen sulfate at a pot temperature of 140° C. to 160° C. under 5 mm. of mercury pressure. The distillate (2.8 grams, $n_D^{20}$=1.4578), was redistilled over sodium bicarbonate under reduced pressure, the cut (1.5 grams) boiling at 45° C.–95° C. under 2.5 mm. of mercury pressure being collected.

It was determined by vapor phase chromatography (VPC) that said cut contained 43% of Rosenoxyd (I). Identification of the Rosenoxyd was made by comparison of the infra red spectra of the cut of this example and an authentic sample of Rosenoxyd obtained from geranium oil.

EXAMPLE III

*Preparation of 2-(2'-Methyl-1'-Propenyl)-4-Methyl-Tetrahydropyrane*

A quantity of 28 grams of 3,7-dimethyloctane-1,6,7-triol was heated with 1.1 grams of p-toluene sulfonic acid in a Claisen distilling flask at a pot temperature of 120° C.–220° C. and a pressure which was reduced from 70 mm. of mercury at the outset to 20 mm. of mercury within 30 minutes. An oil (18 grams) distilled off at a vapor temperature of 60°–130° C.

Another portion (18 grams) of the triol, along with 0.3 gram of p-toluene sulfonic acid, was added to the residue, and the heating was continued at a pot temperature of 120° C.–250° C., and a pressure of 20 mm. of mercury. An oil (13 grams) was collected as the distillate at a vapor temperature of 60°–130° C. and this oil was combined with the 18 gram oil fraction previously collected as a distillate.

The combined oil cuts were redistilled, the portion distilling at 60°–110° C. under a pressure of 15 mm. of mercury being neutralized with 0.5 ml. of 50% aqueous sodium hydroxide. Redistillation of the resulting neutralized portion, under a pressure of 20 mm. of mercury pressure gave 13.9 grams of an oil ($n_D^{20}$ of 1.4535–1.4565 B.P. 60°–72° C.) which was found, by vapor phase chromatographic analysis, to contain 42% of Rosenoxyd (I).

EXAMPLE IV

*Preparation of 2-(2'-Methyl-1'-Propenyl)-4-Methyl-Tetrahydropyrane*

A quantity (63 grams) of 3,7-dimethyloctane-1,6,7-triol (⅓ mole) was heated with 13 grams of 85% concentration, phosphoric acid (⅛ mole) under a vacuum of 100–110 mm. of mercury pressure at a pot temperature of 120°–170° C. An additional quantity (40 grams) of the triol was added to the mixture over a period of one hour, while maintaining the pot temperature and reduced pressure conditions. There was obtained a distillate consisting of an oil, $n_D^{20}$=1.4515–1.4553, which was found to contain 42.3% of Rosenoxyd by VPC analysis.

*Preparation of 2-(2'-Methyl-1'-Propenyl)-4-Methyl-Tetrahydropyrane*

EXAMPLE V

A quantity of 94.5 grams of 3,7-dimethyloctane-1,6,7-triol was heated under agitation with 19.5 grams of 85% phosphoric acid (molar ratio 1:3) at 80–90° C. to form a clear, homogeneous triolmonophosphate ester. This viscous reaction product was then fed within a two hour period through an upright 2½ ft. glass column packed with 3/16 inch glass helices heated to 170° C. while a vacuum of about 100–700 mm. of mercury was applied to the bottom, collecting the product in an ice-cooled receiver.

The reaction mixture was neutralized with 5% NaOH and refluxed under an oil trap, collecting 15.5 grams of an oil ($n_D^{20}=1.4558$–1.4543) containing 50.2% Rosenoxyd by VPC analysis, leaving behind unreacted triol in the distillation flask.

EXAMPLE VI

*Preparation of 2-(2'-Methyl-1'-Propenyl)-4-Methyl-Tetrahydropyrane*

A quantity of 20 grams of 3,7-dimethyloctane-1,6,7-triol and 7 grams of $B_2O_3$ was heated at a temperature of 230–280° C. and a pressure of 25 mm. of mercury while 4.5 grams of an oil was collected during the heating. Redistillation of this oil gave 1.3 grams of an oil, B.P. 60–90° C. at 35 mm. ($n_D^{20}=1.4650$), which contained 20% Rosenoxyd by VPC analysis.

EXAMPLE VII

*Preparation of Rosenoxyd and Isomers*

100 grams of the aforementioned triol and 10 g. of 85% commercial phosphoric acid are heated to about 80° C. under agitation until a clear solution is formed. The resulting mixture is fed by gravity within 2 hours into a vertical Pyrex column 3 feet long and 1 inch in diameter filled with glass beads and kept at 200° C. The reaction mixture is separated from the water and heated under 3 mm. pressure until the pot temperature reaches 140° C. while a light fragrant distillate of 15–20 grams is collected. The residue is recycled again into the Pyrex column under the same conditions as before and the resulting reaction product then distilled under the same conditions. A third recycling of the residue will bring the total amount of distilled material to 45–50 g. having an $n_D^{20}=1.4500$–1.4560 leaving a residue of about 30 grams consisting mainly of 3,7-dimethyl-6-oxooctanol.

The distillates were redistilled and a main cut (80% of the total) was collected at 65–85° at 16 mm. pressure, $n_D^{20}=1.4540$–1.4560 and showed the following percentage composition by weight by gas-liquid chromatography.

|  | Rosenoxyd (I) | | Compound II | Compounds III and IV |
|---|---|---|---|---|
|  | cis | trans | | |
| Distillate I | 85 | 3 | 12 | |
| Distillate II | 60 | 10 | 10 | 20 |
| Distillate III | 5 | 35 | 2 | 59 |

EXAMPLE VIII

*Preparation of Rosenoxyd and Isomers*

100 g. aforementioned triol and 3 g. 85% phosphoric acid were heated to 80° C. until a clear solution took place. The mixture was fed by gravity within 1.5 hours into the glass column described in the previous example and maintained at 300° C. The reaction mixture was separated from 19 ml. of water and distilled under 20 mm. pressure until the vapors showed 100° C. A material (43 g.) of $n_D^{20}=1.4640$ was collected. This material showed the following composition by gas-liquid chromatography:

| | Percent |
|---|---|
| Lights (3 peaks) | 20.5 |
| Compounds I cis | 16 |
| Compounds I trans | 18 |
| Compounds II cis | 10 |
| Compounds II trans | 8.5 |
| Compounds III and IV | 11.5 |
| Heavies including ketoalcohol | 15.5 |

EXAMPLE IX

*Identification of Isomers*

The identification of the isomers was made by comparison with authentic samples of Rosenoxyd A$^{(II)}$ and B$^{(I)}$ obtained from the oil of geranium. However, in order to identify all the isomers formed in our reaction mixture (including III and IV) an average cut of 22.5 g. of isomers B.P. 74–81° at 16 mm. pressure, $n_D^{20}=1.4552$, was hydrogenated with 2 g. of Raney nickel at 60 p.s.i. at 50° C. until no more absorption of hydrogen took place (2 hours). The reaction mixture was filtered from the catalyst and distilled at 55–56° at 8 mm. pressure, $n_D^{20}=1.4402$. It had a pleasant fruity and rosy odor. The gas-vapor chromatography showed two main components cis and trans 2-(2'-methylpropyl)-4-methyltetrahydropyran which were identical with the ones obtained from the hydrogenation under the same conditions of an authentic sample of Rosenoxyd B (I).

EXAMPLE X

*Isomerization to Rosenoxyd B Isomer (I)*

100 g. of a main cut of a mixture of I, II, III, and IV, $n_D^{20}=1.4552$ showing the following composition by gas-liquid chromatography:

| | Percent |
|---|---|
| Rosenoxyd A cis (II) | 9 |
| Rosenoxyd A trans (II) | 3 |
| Rosenoxyd B cis (I) | 45 |
| Rosenoxyd B trans (I) | 12.5 |
| Rosenoxyd C+D (III & IV) | 24.5 |
| Ketoalcohol etc. | 6 | was cooled to 5° C. and 10 g. of 85% commercial phosphoric acid was introduced within 5 minutes while the temperature was kept between 5–10° by agitating the mixture kept over an ice bath. The stirring is continued for an additional hour at 10–15° C. and 100 ml. of water were added. After agitation for 5 minutes the top layer was separated, neutralized with soda ash and distilled at 65–80° at 16-mm. yielding 77 g. $n_D^{20}=1.4540$ showing the following composition:

| | Percent |
|---|---|
| Rosenoxyd A cis (II) | 6.5 |
| Rosenoxyd A trans (II) | 10 |
| Rosenoxyd B cis (I) | 60 |
| Rosenoxyd B trans (I) | 7.5 |
| Rosenoxyd C+D (III & IV) | — |
| Ketoalcohol, etc. | 7 |

EXAMPLE XI

*Preparation of Mixtures of Isomers Rich in Rosenoxyd (I)*

A mixture of isomers (10 grams), obtained by distillation of Distillate II, Example VII, and having the below indicated composition, and an index of refraction, $n_D^{20}=1.4552$, and 500 ml. of aqueous sulfuric acid of 0.5° strength was stirred under reflux for 15 minutes. The reaction mixture was then steam distilled, yielding 8 grams of an oil, $n_D^{20}=1.4500$ in the upper layer.

The compositions of the starting material and of the reaction product, as determined by gas-liquid chromotography, was as follows:

| | Starting Material, percent | Reaction Product, percent |
|---|---|---|
| I (cis) | 48 | 78 |
| I (trans) | 13 | 10 |
| II | 12 | 8 |
| III+IV | 27 | 4 |

The foregoing illustrates the practice of this invention, which, however, is not to be limited thereby, but is to be construed as broadly as permissible in view of the prior art and limited solely by the appended claims.

We claim:

1. The process for preparing a mixture comprising Rosenoxyd and isomers, which comprises heating 3,7-dimethyloctane-1,6,7-triol with an acidic dehydration and cyclization catalyst selected from the group consisting of phosphoric acid, p-toluene sulfonic acid, sulfuric acid (40–70% concentration), alkali bisulfates, boron oxides and cupric chlorides at an elevated temperature.

2. The process of claim 1, wherein the temperature is within the range from about 110° C. to about 250° C.

3. The process of claim 1, wherein said catalyst is phosphoric acid.

4. The process of claim 1, wherein said catalyst is aqueous sulfuric acid having a concentration within the range from about 40% to about 70%.

5. The process of claim 1, wherein said catalyst is potassium hydrogen sulfate.

6. The process for enriching the Rosenoxyd content of a mixture of Rosenoxyd and isomers thereof, which comprises subjecting said mixture to acid conditions for a period sufficient to bring about the desired enrichment.

References Cited in the file of this patent

Naves et al.: Helvetica Chimica Acta, vol. 44 pp. 1867–1872 (1961).